United States Patent
Szewczyk et al.

(10) Patent No.: US 12,528,951 B2
(45) Date of Patent: Jan. 20, 2026

(54) METHODS OF MAKING COATED SUBSTRATES HAVING BLOCK RESISTANCE

(71) Applicant: Rohm and Haas Company, Collegeville, PA (US)

(72) Inventors: Janah C. Szewczyk, Collegeville, PA (US); Drew E. Williams, Collegeville, PA (US); Katherine A. Faber, Collegeville, PA (US); Michael D. Bowe, Collegeville, PA (US)

(73) Assignee: Rohm and Haas Company, Collegeville, MI (US)

( * ) Notice: Subject to any disclaimer, the term of this patent is extended or adjusted under 35 U.S.C. 154(b) by 0 days.

(21) Appl. No.: 18/002,503

(22) PCT Filed: Sep. 27, 2021

(86) PCT No.: PCT/US2021/052141
§ 371 (c)(1),
(2) Date: Dec. 20, 2022

(87) PCT Pub. No.: WO2022/072264
PCT Pub. Date: Apr. 7, 2022

(65) Prior Publication Data
US 2023/0312940 A1  Oct. 5, 2023

Related U.S. Application Data

(60) Provisional application No. 63/085,535, filed on Sep. 30, 2020.

(51) Int. Cl.
*C09D 5/16* (2006.01)
*C09D 7/20* (2018.01)
*C09D 7/63* (2018.01)

(52) U.S. Cl.
CPC ............ *C09D 5/16* (2013.01); *C09D 7/20* (2018.01); *C09D 7/63* (2018.01)

(58) Field of Classification Search
CPC ............ C09D 5/16; C09D 7/20; C09D 7/63
See application file for complete search history.

(56) References Cited

U.S. PATENT DOCUMENTS

| 4,311,527 | A | 1/1982 | Lotsch |
| 5,503,517 | A | 4/1996 | Derby |
| 5,613,447 | A | 3/1997 | Trickett |
| 5,712,339 | A | 1/1998 | Guerin et al. |
| 6,258,887 | B1 | 7/2001 | Bardman et al. |
| 6,299,944 | B1 | 10/2001 | Trapani |
| 10,035,923 | B2 | 7/2018 | Betremieux et al. |
| 2003/0055171 | A1 | 3/2003 | Overbeek et al. |
| 2005/0238815 | A1 | 10/2005 | Dvorchak et al. |
| 2010/0009152 | A1* | 1/2010 | Lau ............ C08J 3/16 428/339 |
| 2018/0112051 | A1* | 4/2018 | Leonhardt ........... C08J 3/24 |

FOREIGN PATENT DOCUMENTS

| CN | 105315819 | | 2/2016 | |
| EP | 1591502 | A1 * | 11/2005 | ...... C08G 18/0823 |
| EP | 3328949 | | 6/2018 | |
| JP | 5591659 | | 9/2014 | |
| WO | 2014028203 | | 2/2014 | |
| WO | WO-2014083644 | A1 * | 6/2014 | ........... C09D 4/00 |
| WO | 2017017128 | | 2/2017 | |

OTHER PUBLICATIONS

Brandrup, Polymer Handbook, Wiley Interscience Publishers, 1999.
Fox, Bull. Am. Physics Soc., 1956, vol. 1, Issue 30, No. 3, p. 123.

* cited by examiner

*Primary Examiner* — Robert S Walters, Jr.

(57) ABSTRACT

The present invention provides methods of making block resistant coated substrates, such as boards, sheets, panels, tiles, assemblies or membranes for use in building and construction, such as for exterior use, the methods comprising coating a substrate with a coating composition of one or more aqueous emulsion polymers and one or more photoinitiators, such as a hydrogen abstraction initiator, onto the substrate to form a coated substrate, at least partially curing or drying the coating, and exposing the at least partially cured coating on the coated substrate to UV light to cause the photoinitiator to react with itself or with the coating composition. In the methods, the wavelength of the UV light used preferably matches or at least overlaps the spectral activation or excitation window of the one or more photoinitiators.

9 Claims, No Drawings

METHODS OF MAKING COATED SUBSTRATES HAVING BLOCK RESISTANCE

The present invention relates to methods of making coated substrates, such as boards and coated articles for use in the building and construction trades for use in building construction having a block resistant coating. More particularly, it relates to methods of making aqueous weather resistive barrier polymer coated substrates, such as boards for use as exterior sheathing wherein the methods comprise coating the boards with a coating having in it a photoinitiator that becomes activated or reacts in the presence of ultraviolet (UV) light, drying the coating and then exposing the thus coated boards to UV light to cause the coating to develop block resistance.

When coated substrates, for example, sheathing boards useful as construction panels, are stacked on or under, or come into contact with other coated substrates or with other articles, the coating sometimes "blocks". Coatings block when the coating tack and the pressure caused by stacking the coated article on or under another coated article or by contacting it with another article results in a conjoined unit of the articles such that they cannot be separated from each other; and the polymer coating sticks to the surface of the other article or other coated substrate. In use, the coating can stick to anything it touches, for example, weather stripping, trim, or a frame or wall adjacent a coated window or door. When a coating blocks, the result can leave bare patches of substrate or remove coating or sealant from the coated substrate. In architectural coatings, the ability to separate a stack of coated articles, such as boards, or a coated article from another article it contacts is called "block resistance".

Slip sheets are physical barriers placed between objects to prevent adhesion, sticking, or damage to the products during shipment. Slip sheets can be paper sheets, corrugated paper, polymer films, or polymer foams. Their use is common for any item being packaged and shipped. Many users will add a second slip sheet to the top of the load, in case the pallet is double stacked. Slip sheets provide some level of abrasion protection and are used primarily to keep products clean. However, slip sheets are unreliable: They can be lost, damaged or moved/arranged so as not to fully cover substrates even through no fault of the user, such as by wind. There remains a need to provide a block resistance for coated substrates, such as coated boards, that avoids the need for slip sheets or other extraneous articles or accessories aside from the coated substrates themselves.

WIPO patent publication no. WO 2017/017128 A1, to BASF, discloses multi-component compositions used to form coating films comprising a photo-curable component, a photoinitiator, and a polymer containing coating which does not comprise the photo-curable component. The photo-curable component comprises an ethylenically unsaturated monomer or prepolymer as a component separate from the coating. The photo-curable component must be kept separate from the coating composition until application of the composition. As stated in the publication, "The coating film formed from the composition of the invention has excellent dirt pick-up resistance (DPUR), stain resistance, block resistance, etc." However, the BASF publication does not provide any data or other evidence that the multi-component composition effectively provides block resistance. Further, the presence of unsaturation in any coating may present weatherability issues. Thus, there remains a need for method to provide block resistance using a shelf stable single component composition.

The present inventors have sought to solve the problem of providing block resistant coated substrates, such as boards and other coated articles for use in the building and construction, especially, coated substrates for use in exterior applications, such as sheathing, without the need for multi-component coatings and their attendant handling issues.

SUMMARY OF THE INVENTION

In accordance with the present invention, methods of making a block resistant coated substrate comprise:
at least partially coating the substrate with an aqueous coating composition, such as a weather resistive barrier coating composition, to form an aqueous coating layer, the aqueous coating composition having in it one or more photoinitiators, for example, a hydrogen abstraction initiator or another initiator that reacts or that becomes activated in the presence of ultraviolet (UV) light, preferably, a benzophenone group containing or a xanthone group containing initiator;
at least partially curing or drying, or, preferably, fully curing or drying, the aqueous coating layer to form a coated substrate;
exposing the coated substrate to UV light, preferably, UV light comprising light having a wavelength that matches the spectral activation window of the one or more photoinitiators, thereby causing the coating to develop block resistance and form a block resistant coated substrate. Preferably, in the exposing the coated substrate to ultraviolet (UV) light, the amount of UV light energy having a wavelength that matches the spectral activation window of the one or more photoinitiators to which the coated substrate is exposed ranges from 3.5 $J/cm^2$ or more, or, more preferably, 4.5 $J/cm^2$ or more, or, even more preferably, 5 $J/cm^2$ or more, or, up to 30 $J/cm^2$, or, up to 20 $J/cm^2$. In accordance with the methods of the first aspect of the present invention, the coating on the coated substrate is at least partially cured or dried, and the method may further comprise completing the cure or drying of the coating after the exposing the coated substrate to UV light by drying and/or heating to form a block resistant coated substrate.

In accordance with the methods of the first aspect of the present invention, the exposing the coated substrate to UV light for a period of from 3 seconds to 2 minutes, or, preferably, from 5 to 60 seconds.

In accordance with the methods of the first aspect of the present invention, the method may further comprise cleaning the surface of the block resistant coated substrate with a polar solvent, preferably, an alkanol, or, more preferably, iso propyl alcohol. In the methods wherein the coating on the coated substrate is only partially cured or dried, the method further comprises completing the cure or drying of the coating after the exposing the coated substrate to UV light by drying and/or heating, and prior to the cleaning.

In accordance with the methods of the first aspect of the present invention, the methods comprise at least partially coating a substrate to form an aqueous coating layer, at least partially curing or drying the aqueous coating layer to form a coated substrate, exposing it to UV light to form a block resistant coated substrate, and then stacking another coated or uncoated substrate, for example, a board, onto or under the block resistant coated substrate to form an article stack, or rolling the coated substrate onto itself or onto a multilayer article comprising the block resistant coated substrate, such as a membrane. In accordance with the present invention, the methods may further comprise cleaning the surface of the block resistant coated substrate with a polar solvent, preferably, an alkanol, or, more preferably, iso propyl alcohol, prior to stacking.

In accordance with the methods of the first aspect of the present invention, the aqueous coating composition may comprise one or more aqueous emulsion polymers that have ambient film-forming properties and have a calculated Tg of from −100 to 60° C., or, preferably, from −70 to 55° C., or, even more preferably, from −50° C. to 45° C., or, less than 45° C., or, for example, less than 25° C., or, for example, more than −70° C., or, for example, more than −50° C. The one or more aqueous emulsion polymers may be rubbery or soft at ambient temperature.

In accordance with the methods of the first aspect of the present invention, the aqueous coating composition may comprise one or more aqueous emulsion polymers, for example, in an aqueous weather resistive barrier coating composition of one or more aqueous emulsion polymers chosen from an acrylic polymer and polyurethane dispersions, such as, for example, a copolymer of, in copolymerized form, a $C_1$ to $C_{18}$ alkyl (meth)acrylates, preferably, a copolymer of, in copolymerized form, one or more $C_8$ to $C_{18}$ alkyl (meth)acrylates with methyl methacrylate; copolymers of, in copolymerized form one more $C_2$ to $C_5$ alkyl acrylates with methyl methacrylate; vinyl acetate-acrylic polymers; acrylic styrene copolymers; acrylic vinyl ester copolymers; and acrylic vinyl ether copolymers, such as, copolymers of (meth)acrylates with allyl functional monomers, for example, allyl methacrylate, such as, one or more soft aqueous emulsion polymer having a calculated Tg of from −100 to 25° C., or, preferably, from −70 to 25° C., or, more preferably, −5° C. or less.

Preferably, in accordance with the methods of the first aspect of the present invention the one or more aqueous emulsion polymers comprise, in copolymerized form, one or more soft alkyl (meth)acrylate chosen from one or more of butyl acrylate (BA), 2-ethylhexyl acrylate (2-EHA), ethyl acrylate (EA), dodecyl methacrylate, octadecyl methacrylate, octyl methacrylate, isooctyl methacrylate, decyl methacrylate (n-DMA), isodecyl methacrylate (IDMA), pentadecyl methacrylate, stearyl methacrylate (SMA), octyl acrylate, isooctyl acrylate, decyl acrylate, isodecyl acrylate, and lauryl acrylate (LA).

Preferably, in accordance with the methods of the first aspect of the present invention the one or more aqueous emulsion polymers comprise, in copolymerized form, combinations of one or more soft alkyl (meth)acrylates with, in copolymerized form one or more of ($C_2$ to $C_5$) alkyl methacrylates, cyclohexyl acrylate, cyclohexyl methacrylate or methyl methacrylate (MMA).

Preferably, in accordance with the methods of the first aspect of the present invention, the one or more aqueous emulsion polymers comprise, in copolymerized form, a combination of one or more of butyl acrylate (BA), 2-ethylhexyl acrylate (2-EHA), ethyl acrylate (EA), dodecyl methacrylate, octadecyl methacrylate, octyl methacrylate, isooctyl methacrylate, decyl methacrylate (n-DMA), isodecyl methacrylate (IDMA), pentadecyl methacrylate, stearyl methacrylate (SMA), octyl acrylate, isooctyl acrylate, decyl acrylate, isodecyl acrylate, and lauryl acrylate (LA) with, in copolymerized form, one or more ($C_2$ to $C_5$) alkyl methacrylates, cyclohexyl acrylate, cyclo hexyl methacrylate or methyl methacrylate (MMA).

Preferably, in accordance with the methods of the first aspect of the present invention the one or more aqueous emulsion polymers comprise, in copolymerized form, any one or more acrylic or vinyl monomers copolymerized with an acid and/or hydroxyl group containing monomer.

Preferably, in accordance with the methods of the first aspect of the present invention, the aqueous coating composition contains a metastable aqueous emulsion copolymer of one or more of butyl acrylate (BA), 2-ethylhexyl acrylate (2-EHA), ethyl acrylate (EA), and dodecyl methacrylate and octadecyl methacrylate copolymerized with an acid and/or hydroxyl group containing monomer, preferably, a carboxyl group containing monomer or its salt, or, more preferably, (meth)acrylic acid. In the metastable aqueous emulsion polymer of the present invention, for example, the amount of the acid and/or hydroxyl group containing monomer may range from 0.1 to 3 wt. %, or, for example, from 0.2 to 2 wt. %, such as from 0.3 to 2.0 wt. %.

Preferably, in accordance with the methods of the first aspect of the present invention, the aqueous coating composition contains a metastable aqueous emulsion copolymer of, in copolymerized form, one or more of butyl acrylate (BA), 2-ethylhexyl acrylate (2-EHA), ethyl acrylate (EA), dodecyl methacrylate or octadecyl methacrylate copolymerized with butyl methacrylate (BMA), methyl methacrylate (MMA) with, in copolymerized form, an acid and/or hydroxyl group containing monomer, preferably acrylic acid.

The one or more aqueous emulsion polymer of the aqueous coating composition in accordance with the present invention may comprise a weather resistive barrier coating composition, such as one comprising one or more aqueous emulsion polymers, preferably, one or more acrylic aqueous emulsion polymers having a calculated Tg of 25° C., or less.

In accordance with the methods of the first aspect of the present invention, wherein the photoinitiator in the aqueous coating composition comprises a hydrogen abstraction initiator, such as a diphenyl ketone or a xanthone, or another photoinitiator that will crosslink or react with itself, dimerize or oligomerize upon exposure to ultraviolet light.

Preferably, in accordance with the methods of the first aspect of the present invention, the photoinitiator in the aqueous coating composition is chosen from benzophenones, alkyl benzophenones, aryl benzophenones, acetoxyalkyl substituted benzophenones, xanthones, thioxanthones, and mixtures thereof. More preferably, in accordance with the method of the first aspect of the present invention, the photoinitiator in the aqueous weather resistive barrier coating composition is chosen from benzophenone, 4-methylbenzophenone, 2,4,6-trimethylbenzophenone; a xanthone; isopropylthioxanthone; and mixtures thereof, such as 4-methylbenzophenone and 2,4,6-trimethylbenzophenone.

In accordance with the methods of the first aspect of the present invention, the photoinitiator in the aqueous coating composition comprises part of a photoinitiator mixture of the photoinitiator and a solvent, such as propylene glycol monomethyl ether acetate, or, preferably, a vinyl or acrylic monomer that is compatible, dispersible or soluble with the aqueous weather resistive barrier coating material, such as a vinyl ester, a vinyl aromatic or (meth)acrylic ester monomer, or, more preferably, butyl acrylate.

In accordance with the methods of the first aspect of the present invention, the aqueous coating composition comprises from 0.1 to 2.0 wt. % on polymer solids, or, preferably, from 0.2 to 1.4 wt. %, or, preferably, from 0.2 to 0.7 wt. %, or, preferably, less than 0.7 wt. %, based on the total weight of polymer solids in the coating composition, of the one or more photoinitiators.

In accordance with a second aspect of the present invention, a block resistant coated substrate comprises an at least partially cured or dried coating layer of an aqueous emulsion polymer coating composition comprising one or more aqueous emulsion polymers, preferably, one or more acrylic aqueous emulsion polymers, such as layer of an at least partially cured or dried weather resistive barrier coating composition, the coating layer having in it one or more photoinitiators, for example, a hydrogen abstraction initiator or another initiator that reacts or that becomes activated in the presence of ultraviolet (UV) light, preferably, a benzophenone group containing or a xanthone group containing initiator, wherein the one or more photoinitiators have reacted with themselves, dimerized or crosslinked the coating or have migrated to the surface of the coating. The block resistant coated substrate may comprise any coated board, membrane, sheet, tile, panel, assembly, such as a window profile or structural section, or other article suitable for use in the building and construction trades.

Further, in accordance with the second aspect of the present invention, wherein the coating layer comprises one or more at least partially cured or dried acrylic aqueous emulsion polymers having a calculated Tg of 25° C., or less. Further, in accordance with a second aspect of the present invention, a stack of articles or a rolled article comprises the block resistant coated substrate, and, in the case of a stack, another article or coated substrate, for example, a board, or another block resistant coated substrate stacked on or under the block resistant coated substrate. Unless otherwise indicated, conditions of temperature and pressure are ambient temperature (23° C.) and standard pressure (101.3 Kpa).

Unless otherwise indicated, any term containing parentheses refers, alternatively, to the whole term as if no parentheses were present and the term without them, and combinations of each alternative. Thus, the term "(poly) ethylene glycol" refers to ethylene glycol, polyethylene glycol or their mixtures.

All ranges are inclusive and combinable. For example, the term "one or more photoinitiators in the amount of from 0.1 to 2.0 wt. %, or, preferably, from 0.2 to 1.4 wt. %, or, preferably, from 0.2 to 0.7 wt. %, or, preferably, less than 0.7 wt. %" would include total photo initiator in the amount of from 0.1 to 2.0 wt. %, or, from 0.1 to 1.4 wt. %, or, preferably, from 0.1 to 0.7 wt. %, or, preferably, from 0.1 to 0.2 wt. %, or, from 0.2 to 2.0 wt. %, or, preferably, from 0.2 to 1.4 wt. %, or, preferably, from 0.2 to 0.7 wt. %, or, from 0.7 to 2.0 wt. %, or, preferably, from 0.7 to 1.4 wt. %, or, from 1.4 to 2.0 wt. %.

As used herein, the term "acrylic" refers to alkyl esters, hydroxyalkyl esters, phosphorous or sulfur containing acid esters, salts, amides, or nitriles of acrylic or methacrylic acid.

As used herein, the term "ambient" means the conditions in the space where a method or use takes place or where a composition or product is, including conditions of temperature and pressure. For example, the ambient conditions of room temperature include the temperature and pressure in a given indoor room or space.

As used herein, the term "aqueous" refers to a carrier or solvent comprising water and up to 50 wt. % of one or more water miscible organic solvents, such as alkyl ethers.

As used herein, the term "ASTM" refers to publications of ASTM International, West Conshohocken, PA.

As used herein, the term "blocking resistance" or "block resistance" refers to an undesirable adhesion between two coated surfaces or between paint and weather stripping or other surfaces against which a coated article may rest, such as a door or window frame.

As used herein, the term "calculated glass transition temperature" or "calculated Tg" means the value calculated using the Fox equation (Fox, Bull. Am. Physics Soc., Volume 1, Issue No. 3, page 123 (1956)), as follows:

$$1/Tg(\text{calc.}) = \Sigma w(M_1)/Tg(M_1) + w(M_2)/Tg(M_2) + \ldots w(Mn)/Tg(Mn)$$

wherein Tg (calc.) is the glass transition temperature calculated for the copolymer, $w(M_1)$ is the weight fraction of monomer M1 in the copolymer, $w(M_2)$ is the weight fraction of monomer M2 in the copolymer, $w(Mn)$ is the weight fraction of monomer Mn in the copolymer, $Tg(M_1)$ is the glass transition temperature of the homopolymer of M1, $Tg(M_2)$ is the glass transition temperature of the homopolymer of M2, and $Tg(Mn)$ is the glass transition temperature of the homopolymer of Mn, all temperatures being in ° K.

The glass transition temperatures of homopolymers may be found, for example, in Polymer Handbook, edited by J. Brandrup and E. H. Immergut, Wiley Interscience Publishers, New York, 1999.

As used herein, the term "(meth)acrylate" means acrylate, methacrylate, and mixtures thereof and the term "(meth) acrylic" used herein means acrylic, methacrylic, and mixtures thereof.

As used herein, the term "pigment volume concentration" or % PVC refers to the quantity calculated by the following formula:

$$PVC(\%) = 100\% \times \frac{(\text{volume of pigment}(s) + \text{volume extender}(s) + \text{volume of filler}(s))}{\text{Total dry volume of coating.}}$$

As used herein, the term "polymer" includes homopolymers and copolymers that are formed from two or more different monomer reactants or that comprise two distinct repeat units.

As used herein, the term "total solids" or "solids" refers to all materials, including polymers, in a given composition aside from solvents, liquid carriers, unreactive volatiles, including volatile organic compounds or VOCs, ammonia and water.

As used herein, the phrase "wt. %" stands for weight percent.

In accordance with the present invention, methods of making a block resistant coated article comprise treating a coated substrate with or exposing the coated substrate to ultraviolet (UV) light, wherein the coating on the coated substrate comprises an at least partially cured or dried aqueous coating composition containing one or more photoinitiators. The methods may comprise coating a substrate to form an aqueous coating layer, at least partially curing or drying the aqueous coating layer to form a coated substrate and then treating the coated substrate with UV light to form a block resistant coated substrate. The present inventors have discovered that a quick, for example, 10 second to 20 minute, UV light treatment of a coated article having an at least partially cured or dried coating layer thereon enables provision of block resistant coated articles even if the coatings are not fully cured. The methods of the present invention enable the ready provision of stackable or rollable coated articles for use in the building and construction trades, such as, for example, coated construction panels, boards, sheets, membranes or tiles, or stacks of articles or rolls comprising them. Accordingly, exposing the at least partially cured or dry coating of the present invention to ultraviolet (UV) light thereby provides block resistance to the coated substrates so that when stacked, stored, and shipped they can be unstacked and used without damage to the coating or substrate. For example, the methods may comprise applying the UV light in a factory production line to exterior sheathing boards having thereon a dried acrylic emulsion polymer weather resistive barrier coating, whereby the UV light crosslinks, dimerizes or oligomerizes the photoinitiator, such as, for example, a benzophenone contained within the coating. The methods of the present invention thereby provide coated substrates having block resistance to other coated or uncoated substrates or other articles with which they come into contact, such as in use or storage. Other coated or uncoated substrates or other articles with which the coated substrates come into contact may be, for example, an adjacent structure or article, such as a trim piece, door frame, wall panel or assembly, roof panel or assembly, floor panel or assembly, or window frame or assembly, any of which is coated or uncoated. The coated substrates may have block resistance to the same kind of coated substrate, so that when they are stacked, stored, and shipped to a job site and can be unstacked and used without damage to the coating or substrate, all without the use of a physical slip sheet article.

In accordance with the methods of the present invention, the at least partially curing or drying of an aqueous coating layer after coating an aqueous emulsion polymer coating composition on a substrate may comprise drying the aqueous coating layer on the surface of the coated substrate, such as a board, such as, for example, for a period of from 5 minutes to 7 days, or, preferably, from 10 minutes to 48 hours, and at temperatures of from 5° C. to 100° C., for example, at room temperature or in a 50° C. oven. Sufficient curing or drying when coupled with treating the coated substrate with UV light provides coated articles that are dry to the touch or which have tack free surfaces. To make coatings on coated substrates tack free or dry to the touch, curing or partially curing or drying at a lower temperature requires a longer cure time; whereas curing or partially curing or drying at a higher temperature requires less time. For example, one might cure or dry a coating in a ° C. oven for 10 minutes or at room temperature and 50% relative humidity (RH) for 12 to 24 hours. Multiple temperatures and multiple cure or dry periods may be employed to maximize energy use or minimize process time. For example, one could finish curing or drying of some part or all of the substrate itself after coating it, such as by curing or drying the resin in a plywood or sheathing substrate after applying the aqueous coating composition thereto.

To improve the block resistance of UV treated coated substrates, including any of membranes, panels, tiles, sheets or boards at pressures above 69 kPa (0.68 atmospheres) and temperatures above room temperature, the methods of the present invention may comprise cleaning the surface of the coated substrates after exposing them to UV light, for example, by cleaning them with a polar solvent, such as a solution of isopropyl alcohol to lightly wipe the board surface. Such cleaning further helps to remove tack from the substrate surface.

In accordance with the methods of the present invention, the use of one or more ultraviolet lights at wavelengths that will cause activation of or that will excite the photoinitiator on a coating surface to extract hydrogen atoms from nearby donors will cause the photoinitiator to react with itself, with a hydrogen donor, or with the surface of the coating, providing sufficient block resistance to eliminate the need for a slip sheet between stacked substrates or stacked boards.

Suitable substrates for coating in accordance with the methods of the present invention and suitable block resistant coated substrates of the present invention may comprise any board, membrane, sheet, tile, panel, assembly or other article for use in the building and construction trades that can successfully be coated and then stacked with other stackable articles or rolled onto itself or itself. Suitable substrates may comprise any board, sheet, membrane, tile, wall assembly; window assembly or portion thereof, such as a profile; door assembly; roof assembly; floor assembly or panel made from wood, plywood, oriented strand board (OSB) particle board, metal, cement, ceramic, gypsum, polymer, polymer foam, or any multilayer article thereof, for example, any board, sheet, membrane, tile or panel which itself can be coated or uncoated. Suitable substrates may include, for example, cladding; cement fiberboards; gypsum boards, such as facer boards containing a fiberglass facing; or foam coated sheathing or cladding, including or not including a foil layer thereon. Suitable substrates may include membranes, such as rubber (y) membranes used in roofing or waterproofing applications. Another example of a suitable substrate for use in accordance with the methods of the present invention may include plywood or wood sheathing (e.g. oriented strand board) made by compressing wood chips impregnated with polymer (e.g. urea or phenol formaldehyde) in a high temperature operation. One could apply the aqueous coating to the sheathing before the heat curing or drying of the sheathing, or after the heat curing or drying while the sheathing is still at an elevated temperature in the sheeting factory.

In accordance with the methods of the present invention, coating a substrate with the aqueous coating compositions can comprise applying the coating compositions by spray equipment, brush or roller. Preferably, the coating composition is factory applied, in which case, in addition to the coating methods above, coating the aqueous weather resistive barrier coating compositions may comprise applying the coating composition on the substrate, e.g. sheathing, by curtain coating, dipping, flood coating, spray, roll or curtain coaters. Preferably, the coated UV treated substrate us oven dried (IR or convection oven) and cooled prior to stacking.

Aqueous emulsion polymers and copolymers suitable for use in accordance with the methods of the present invention can be acrylic or vinyl acetate-acrylic polymers, such as copolymers of, in copolymerized form, $C_1$ to $C_{18}$ alkyl (meth)acrylates and copolymers thereof with styrene, methyl styrene or vinyl ester or vinyl ether monomers, including allyl functional monomers, such as allyl methacrylate, or polyurethane dispersions. Suitable polymers for making the polymer coating of the present invention may comprise aqueous emulsion polymers that are rubbery or soft at ambient temperature. Such polymers may, for example, provide weather resistive barrier coatings having a tacky surface following film formation and drying.

Generally, the one or more aqueous emulsion polymers in accordance with the present invention have ambient film-forming properties and have a calculated Tg of from −100 to 60° C., or, preferably, from −70 to 55° C., or, even more preferably, from −50° C. to 45° C. Such calculated Tgs may range, for example, −5° C. or less, or, for example, 25° C. or less.

In accordance with the methods of the present invention, suitable aqueous emulsion polymers having the desired calculated Tg may comprise, in copolymerized form, any one or more acrylic or vinyl monomers copolymerized with an acid and/or hydroxyl group containing monomer.

Preferably, in accordance with the methods of the present invention the aqueous emulsion polymers comprise, in copolymerized form, one or more soft alkyl (meth)acrylates chosen from one or more of butyl acrylate (BA), 2-ethylhexyl acrylate (2-EHA), ethyl acrylate (EA), dodecyl methacrylate, octadecyl methacrylate, octyl methacrylate, isooctyl methacrylate, decyl methacrylate (n-DMA), isodecyl methacrylate (IDMA), pentadecyl methacrylate, stearyl methacrylate (SMA), octyl acrylate, isooctyl acrylate, decyl acrylate, isodecyl acrylate, and lauryl acrylate (LA). More preferably, the aqueous emulsion polymer comprises, in copolymerized form, alkyl (meth)acrylates chosen from combinations of the one or more of soft alkyl (meth)acrylate with one or more of the ($C_2$ to $C_5$) alkyl methacrylates, cyclohexyl acrylate, cyclo hexyl methacrylate or methyl methacrylate (MMA). Even more preferably, the aqueous emulsion polymers comprise, in copolymerized form, one or more of butyl acrylate (BA), 2-ethylhexyl acrylate (2-EHA), ethyl acrylate (EA), dodecyl methacrylate or octadecyl methacrylate. in combination with methyl methacrylate (MMA).

The polymers or copolymers of the present invention may have solids contents of 40 wt. % or higher, or, for example, 50 wt. % or higher, based on the total weight of the aqueous (co) polymer, or, preferably, 60 wt. % or higher, or up to 70 wt. %. The aqueous binder polymers can be bimodal or polymodal polymers.

The one or more aqueous emulsion polymer of the aqueous coating composition in accordance with the present invention may comprise a weather resistive barrier coating composition, such as one comprising one or more aqueous emulsion polymers, preferably, one or more acrylic aqueous emulsion polymers having a calculated Tg of 25° C., or less. A weather resistive barrier aqueous coating composition should be selected so as to allow for an appropriate water vapor transmission from the building to reduce any moisture condensation in the walls of the building. The vapor transmission rate is most often measured in accordance with ASTM E-96 (1996) and expressed in units of perms, where higher perms correlate with a greater rate of water vapor transmission. Oriented strand board (OSB), a common sheathing material, has approx. 3-6 perms. For a home, in which interior moisture from cooking and bathing is generated, a weather resistive barrier (b) with >10 perms may be desired. By contrast, for commercial buildings with higher capacity HVACs that remove sufficient moisture from the interior so that water does not condense in the walls, a low perm weather resistive barrier may be preferred. One skilled in the art of coating composition formulation can make coatings with a desired perm value, measuring candidate coating compositions (b) according to ASTM E-96. Further, commercially available coatings are sometimes provided with a perm data, which can aid in the selection of a coating properly matched to the building science teachings.

Other examples of suitable polymers for use in aqueous weather resistive barrier coating compositions may include aqueous emulsion polymers like metastable acrylic emulsion polymers, styrene-acrylics (e.g. RHOPLEX™ 2019R polymer from Dow or ACRONAL™ S-400 from BASF); ethylene-vinyl acetates, and styrene-butadienes. Aqueous polyurethane dispersions may also be used. Examples of suitable aqueous emulsion polymers are described in U.S. Pat. No. 7,179,845 (Fomo Products Inc.). Useful acrylic emulsion polymers include RHOPLEX™ EC-2540 polymer, RHOPLEX™ EC-2020 polymer, RHOPLEX™ EC-1791 QS polymer, RHOPLEX™ MC-1834 polymer, and RHOPLEX™ AC-630, all from The Dow Chemical Co. of Midland, MI. Rovace™ 9100 polymer is an acrylic-vinyl acetate copolymer.

Preferably, the aqueous emulsion polymer comprises a flexible, acrylic polymer emulsion, such as that sold as RHOPLEX™ EC-2540 coating (Dow).

A blend of 90 parts RHOPLEX™ EC-2540 polymer/10 parts Ropaque™ Ultra E (a non film forming polymer), both from Dow provides coating opacity.

Other suitable polymers include:

Sto GOLD COAT™ yellow coating containing a preferable styrene-acrylic copolymer, rated at 5.7 Perms (Sto Corp of Atlanta, Ga).

Preferred polymers include any with a rating of at >10 perms according to ASTM E-96 (1996), such as Henry AIRBLOC™ 33 coating, a black coating containing acrylic copolymer (rated at 11.6 Perms) from Henry Inc. of Huntington Park, Calif.

One particularly preferred weather resistive barrier coating containing a metastable butyl acrylate-methyl methacrylate-acrylic acid copolymer (calculated Tg: −35° C.) is formulated for factory applications to be applied via spray, roll or curtain coaters, oven dried (IR or convection oven) and cooled prior to stacking.

Suitable photoinitiators or ultraviolet absorbing compounds for use in the methods of the present invention may comprise a diphenyl ketone or any other photoinitiator that are activated or excited upon exposure to ultraviolet light, preferably UV-A or UV-B light. Such a photoinitiator will crosslink or react with a hydrogen donor, react with itself, or dimerize or oligomerize. Suitable photoinitiators may be chosen from benzophenones; alkyl, aryl or acetoxyalkyl substituted benzophenones, for instance 4-methylbenzophenone or 2,4,6-trimethylbenzophenone; xanthones; thioxanthones, such as isopropylthioxanthone; and mixtures thereof, such as 4-methylbenzophenone and 2,4,6-trimethylbenzophenoneas well as mixtures thereof.

The aqueous coating composition in accordance with the present invention may comprise one or more aqueous emulsion polymers made by conventional polymerization in water in the presence of an initiator and surfactants or emulsifiers, followed by letdown of the aqueous emulsion polymer into an aqueous pigment dispersion or paste.

The one or more photoinitiators of the present invention may be present in a mixture, such as a water compatible or aqueous dispersion or solution, that can be combined with or mixed an aqueous coating composition. Preferably, the photoinitiator containing mixture comprises the one or more photoinitiators and an acrylic or vinyl monomer that is compatible with the aqueous coating composition material in which the photoinitiator is dispersible or soluble, such as a vinyl ester, vinyl aromatic or (meth)acrylic ester monomer, even more preferably, butyl acrylate. For example, a benzophenone photoinitiator can be add added to an aqueous monomer emulsion during processing, such as before or during polymerization, or letdown into an aqueous emulsion polymer coating.

Optional ingredients in the aqueous coating compositions in accordance with the present invention may include biocides (e.g. mildewcides, fungicides and/or bactericides), insecticides, insect repellants, rheology modifiers, extenders (fillers), opacifying pigments (mineral and organic (e.g. opaque polymer)), colorants, fly ash, dispersants, defoamers, UV stabilizers, colorants, fire retardants, pH adjusters or buffers, coalescents, cosolvents, glass fibers, carbon fibers, microbeads and anti-freeze agents. It is particularly advantageous to employ an opacifying pigment as it allows the aqueous coating to be seen on the coated substrate to alert one to any spots that might be missed, and to give the consumer and the installer an assurance that enough coating has been applied. Preferably, the aqueous coating compositions of the present invention may comprise one or more fillers, pigments or extenders, or, more preferably, one or more sacrificial metal oxides, such as zinc oxide. The one or more sacrificial metal oxides may be used in the amount of from 0.2 to 10 wt. %, or, for example, from 1 to 5 wt. %, based on the total weight of the aqueous coating composition.

Optionally, the aqueous coating composition comprises an infrared-reflective material such as ARCTIC™ infrared reflective pigments (Shepherd Color Company, Cincinnati, OH). Other suitable IR-reflective pigments are aluminum flake reflective pigment, such as those from Eckart America Corp of Louisville, Ky. Other examples of suitable infrared-reflective pigments include those described in Lotsch, U.S. Pat. No. 4,311,527.

The advantage of infrared-reflective materials in the aqueous coating composition of the present invention is that heat is reflected in the direction where heat originates: (1) out of the building in summer; and (2) into the heated building in winter. This can achieve year-round energy efficiency.

The aqueous coating compositions of the present invention can contain fire retardant or fire protective extenders and/or chemical flame retardants. Such extenders include alumina trihydroxide or magnesium hydroxide (Huber Engineered Materials, Atlanta, GA) and vermiculite. Chemical flame retardants include compounds that are brominated as well as organo-phosphorus or boron-based. Such materials are available from Albemarle Corp. of Baton Rouge, La.

Preferably, the aqueous coating compositions of the present invention contain materials that impart freeze-thaw stability. Such materials include propylene glycol and ethylene glycol. One can also use surfactants like TRITON™ X-405 nonionic surfactant (The Dow Chemical Company, Midland, MI) or an octylphenyl ethoxylate surfactant to impart in-can freeze-thaw resistance to the aqueous coating compositions.

EXAMPLES: The following examples are used to illustrate the present invention without limiting it to those examples. Unless otherwise indicated, all temperatures are ambient temperatures (21-23° C.), relative humidity is 50%, and all pressures are 1 atmosphere.

Component proportions are indicated in the examples, below. The following abbreviations are used: Pbw: Parts by weight; psi: pounds per square inch; RH: Relative Humidity.

The aqueous coating compositions indicated in Tables 1, 2 and 3, below, comprise aqueous emulsion polymers and the indicated one or more pigment(s), filler(s) and/or extender(s), in a given pigment volume concentration (% PVC) at a solids content of from 49 and 60%. Unless otherwise indicated, the aqueous emulsion polymers having the indicated measured glass transition temperature (measured Tg) as measured by Differential Scanning calorimetry (from −90° C. to 150° C. at a rate of 20° C. per minute, following an initial preheat to 150° C. at a rate of 20° C. per minute for an isotherm for 2 min prior to equilibrating at −90° C. for 2 min in order to normalize the polymer prior to measurement), taking the midpoint of the inflection as the measured Tg) were formed by conventional gradual addition polymerization of a monomer mixture alkyl (meth)acrylate monomers with one or more ethylenically unsaturated carboxylic acid monomers or their salt(s) to form a metastable emulsion polymer. Coating compositions that contained a photoinitiator comprised benzophenone in the amount of 0.30 wt. %, based on polymer solids.

The coatings indicated in the examples that follow were formed from the coating compositions indicated in Tables 1, 2 and 3, below, by coating them on the substrate indicated, and in the manner indicated in each of the test methods, below. In each of the test methods that follow, the cure belt comprised an LC6B FUSION™ UV Benchtop Conveyor Gaithersburg, MD) and the UV energy transferred was measured using a UV Power Puck II radiometer (Electronic Instruments and Technology, Leesburg, VA) positioned on the belt. As used in Tables 1, 2, and 3, below, the term "UV energy" refers to the sensed amount of energy emitted from the UV source on the cure belt during UV light exposure, or the exposure period, as the UV energy transferred to or accumulated in the substrate over the length of the exposure period. The Energy density is recorded in Joules/cm^2, joules of energy is defined as $Kg*m^2/s^2$, which accounts for the duration of exposure.

TEST METHODS: The following test methods were used in evaluating the Examples.

Block Resistance Test with free weights: In each example indicated in Table 2 below, an aluminum Q panel (A46 mill finish, Q Labs Corporation Westlake, OH) was coated with the indicated coating composition using a 100 mm wide GARDCO™ Multiple Clearance Square Applicator (Paul N Gardner Company, Inc., Pompano Beach, FL) to cast a 381 micron thick wet film onto the substrate. Each coated panel was dried at ambient conditions for 7 days (21° C. and ~50% RH). Once dry, the indicated coated panel was exposed to ultraviolet (UV) light on a cure belt (LC6B FUSION™ UV Benchtop Conveyor Gaithersburg, MD) equipped with a lamp having an iron doped mercury UV bulb having a spectral window of from 205 nm to 445 nm and emitting radiation in the UV-A range. The UV lamp intensity was set to 100% intensity with the conveyor speed set to 16 feet per min. The coated panels were passed through the belt one or more times to form a UV treated coating, with longer exposures transferring proportionally more UV energy onto the coating, before block resistance testing. Total UV energy transferred onto each coating was recorded in Tables 2, 3 and 4, below.

Black LENETA scrub panels (Form P121-10N Leneta Company, Inc., Mahwah, NJ), were cut to 5.12 cm×5.12 cm (2 in×2 in) squares and placed directly and congruently onto a 5.12 cm×5.12 cm (2 in×2 in) square of the indicated UV treated coated panel. A wood panel spacer 5.12 cm×5.12 cm×0.96 cm thick (2×2×⅜ in) was placed congruently on top of the LENETA panel followed by a 10.24×15.36×0.64 cm (4×6×¼ in) aluminum panel directly and congruently placed over the spacer to support and stabilize one 4.54 kg (10 lb) standard cast weight plate (Dick's Sporting Goods, Pittsburgh, PA) which was used to apply a constant load onto the coating surface. The weight was applied over a 25.8 cm² (4 in²) area created pressure starting at 17.25 kpa (2.5 psi) and the weight tested was increased by 17.25 kpa (2.5 psi) with each additional weight applied, with two 4.54 kg (10 lbs) weights providing 34.5 kpa (5 psi) of pressure. The assembly was kept at 23° C., 50% RH or 50° C./30% RH, as indicated, for 1 h after which the indicated weight and spacers were removed. After 1 min, the LENETA chart was removed to determine block resistance. For each coated Q panel, a total of two squares of coating were tested at the indicated weight loading and the results were identical and thus, the second square confirmed the results from the first square. The nature of coating damage and the amount of removed coating was recorded. If the Leneta scrub panel was easily removed, the coating passed. If removing the Leneta scrub panel required effort or damaged the coating, the coating failed.

Block Resistance Test with C-Clamps: In each example indicated in Table 3, below, an oriented strand board (Georgia Pacific, Augusta, GA) substrate was coated with the indicated coating composition using a 100 mm wide GARDCO™ Multiple Clearance Square Applicator (Paul N Gardner Company, Inc., Pompano Beach, FL) to cast a 381 micron thick wet film onto the substrate. The indicated coating was dried at ambient conditions for 7 days (~21° C. and ~50% RH). Once dry, the indicated coating was exposed to ultraviolet (UV) light on a cure belt (LC6B Fusion™ UV Benchtop Conveyor Gaithersburg, MD) equipped with a lamp having an iron doped mercury UV bulb having a spectral window of from 205 nm to 445 nm and emitting radiation in the UV-A range. The UV lamp intensity was set to 100% intensity with the conveyor speed set to 16 feet per min. The UV treated coated wood boards were passed through the cure belt the indicated number of times before block resistance testing to create UV treated coated wood boards.

Each UV treated coated wood board was placed directly and congruently on top of a 10.24×15.36×0.64 cm (4 by 6×0.25 in) aluminum plate. A second wood board 5.12×5.12×0.96 cm (2×2×⅜ in), used as the block producing material, was placed directly and congruently onto a square of the coating to form a test block. A second aluminum plate was placed directly and congruently on top of test block to form a bracketed test assembly. Two C-clamps with a 10.24 cm (4 in) wide mouth were used to apply pressure to the bracketed test assembly. A torque wrench, calibrated using a spring scale in a bracketed test assembly at 20.3 Nm yielding 36 kg of load over 25.4 square centimeters (15 lb-ft yielding 80 pounds of load over 4 square inches), was used to apply a total of 72.5 kg of load over 25.4 square centimeters or 275 kpa (160 pounds of load over 4 square inches or 40 psi) of pressure on the clamped bracketed test assembly via the two c-clamps. The bracketed test assembly was then placed in a 50° C. oven for 4 or 18 hours, as indicated, to cure the indicated coating. After testing was complete, the C-clamps were unthreaded, the pressure and the aluminum plates were removed, and the test specimens were evaluated for block resistance. For each indicated wood board, a total of two squares of coating were tested and the results were identical. For each indicated coated wood board, the nature of coating damage and the amount of removed coating was recorded. If the second wood board was easily removed, the coating passed. If removing the second wood board required effort or damaged the coating, the coating failed.

Block Resistance Test with hydraulic Hot Press: In each example indicated in Table 4, below, an oriented strand board (Georgia Pacific, Augusta, GA) substrate was coated with the indicated coating composition using a 100 mm wide GARDCO™ Multiple Clearance Square Applicator (Paul N Gardner Company, Inc., Pompano Beach, FL) to cast a 381 micron (15 mil) thick wet film onto the substrate. The indicated coating was dried at ambient conditions days (~21° C. and ~50% RH). Once dry, indicated coatings were exposed to ultraviolet (UV) light on a cure belt (LC6B Fusion™ UV Benchtop Conveyor, Gaithersburg, MD) equipped with a lamp having an iron doped mercury bulb with a spectral window of 205 nm to 445 nm and emitting radiation in the UV-A range. The UV lamp intensity was set to 100% with the conveyor speed at 16 feet per min. The UV treated coated wood boards were passed through the cure belt the indicated number of times before block resistance testing to create UV treated coated wood boards. A test block comprised the indicated UV treated coated wood board having a 5.12×5.12×0.96 cm (2×2×⅜ in) second wood board placed directly and congruently onto a square of the coating and used as the block producing material.

A hydraulic hot press (Fred S Carver Inc., Menomonee Falls, WI) was used to apply 275 kpa (40 psi) of pressure at 60° C. onto the test block assembly. The test block assembly consisted of the indicated test block and the hydraulic press, which included two insulated heated metal panels, one insulated heated metal panel above and one below the test block. Each metal panel was equipped with a thermocouple connected to a digital controller. Using a 5.12 cm×5.12 cm (2 in×2 in) test block, the press was constrained to limit the press load to 72.6 kg (160 lb) and the pressure to 275 kpa (40 psi). The test block assembly was held at the indicated temperature and pressure for 4 hours and then pressure was released and the assembly removed from the test block. Following several minutes five minutes needed to safely shut down the hydraulic press, the test block was evaluated for block resistance. For each indicated UV treated coated wood board, a total of two squares of coating were tested and the results were recorded. In each example tested below, the result from the second square confirmed the result from the first square. For each indicated coated wood board, the nature of coating damage and the amount of removed coating was recorded. If the second wood board was easily removed, the coating passed. If removing the second wood board required effort or damaged the coating, the coating failed.

Alcohol Wipe Block Resistance Test: An oriented strand board (Georgia Pacific, Augusta, GA) substrate was coated with the indicated coating composition using a 100 mm wide GARDCO™ Multiple Clearance Square Applicator (Paul N Gardner Company, Inc., Pompano Beach, FL) to cast a 381 micron (15 mil) thick wet film onto the substrate to form a coating on the wood board. The coating was dried at ambient conditions for 7 days (21° C. and ~50% RH). Once dry, indicated coatings were exposed to ultraviolet (UV) light on a cure belt (LC6B Fusion™ UV Benchtop Conveyor, Gaithersburg, MD) equipped with a lamp having an iron doped mercury bulb with a UV spectral window of 205 nm to 445 nm and emitting radiation in the UV-A range. The UV lamp intensity was set to 100% with the conveyor speed at 16 feet per min. The coated wood boards were passed through the belt the indicated number of times before block resistance testing to create UV treated coated wood boards. Following UV light exposure, the indicated UV treated coated wood boards were wiped by with an iso propyl alcohol CAS #67-63-0; (Sigma Aldrich; St. Louis, MO) soaked KIMTECH™ dry wipe (Kimberly Clark, Dallas TX) with light pressure the iso propyl alcohol wet wipe over the UV cured coating back and forth once. Each wiped UV treated coated wood board was dried for a minimum of 10 min and was then subject to the indicated block resistance testing.

As shown in Table 2, below, the iron doped mercury bulb emitted UV-A radiation which has a wavelength that matches the spectral activation window for the given photoinitiator, BZP. The UV treated softer polymer coating of Example 2 at 38% PVC passes a block resistance test at a pressure of 34.5 kpa (5 psi) at 23° C., 50% RH. Further, UV provides block resistance in the coating of the harder polymer of Example 4 at 30% PVC, 50° C. elevated temperature test at 17.25 (2.5 psi). The UV treatment enables block resistance where the UV wavelength used to treat the coating at a wavelength that matches the wavelength of the activation energy of the initiator.

TABLE 1

Coating Formulations for Examples

| Example | 1 | 2 | 3 | 4 | 5-12 |
|---|---|---|---|---|---|
| Coating Composition | (pbw) | pbw | pbw | pbw | pbw |
| Water | 15.93 | 15.93 | 17.68 | 17.68 | 18.28 |
| Dispersant[1] | 0.63 | 0.63 | 0.70 | 0.70 | |
| Dispersant[2] | | | | | 1.15 |
| Nonionic Surfactant[3] | | | | | 0.9 |
| Nonionic Surfactant[4] | | | | | 0.9 |
| Defoamer[5] | 0.21 | 0.21 | 0.11 | 0.11 | 0.40 |
| Zinc oxide Pigment[6] | 0.00 | 0.00 | | | 7.17 |
| Calcium Carbonate Pigment[7] | 32.23 | 32.23 | 24.89 | 24.89 | 28.28 |
| Emulsion A: 46.2% solids, Tg −30° C. (86.2 BA/12.5 MMA/1.3 MAA) | 46.73 | 46.73 | | | |
| Emulsion B: 46.7% solids, Tg +30° C. (41.2 BA/57 MMA/1.3 MAA) | | | 51.88 | 51.88 | |
| Emulsion C: 55% solids, Tg −35° C. (86 BA/12.3 MMA/ 1.7 MAA) | | | | | 38.81 |
| Defoamer[8] | | | | | 0.4 |
| Defoamer[9] | | | | | 0.6 |
| Aqua Ammonia (28 wt. %)[10] | 0.06 | 0.06 | 0.07 | 0.07 | 0.25 |
| Propylene Glycol[10] | 0.74 | 0.74 | 0.83 | 0.83 | 1.42 |
| Water | 2.66 | 2.66 | 2.95 | 2.95 | |
| Cellulose ether Thickener[11] | 0.15 | 0.15 | 0.17 | 0.17 | 0.09 |
| Coalescents[12] | 0.65 | 0.65 | 0.72 | 0.72 | |
| Colorant[13] | | | | | 0.58 |
| Colorant[14] | | | | | 0.74 |
| Colorant[15] | | | | | 0.03 |
| Totals | 100.00 | 100.00 | 100.00 | 100.00 | 100.00 |
| Benzophenone | | 0.06 | | 0.063 | |
| Total PVC | 38 | 38 | 30 | 30 | 43 |
| Volume Solids | 40 | 40 | 38 | 38 | 58 |
| Weight Solids | 54 | 54 | 49 | 49 | 38 |

[1]TAMOL ™ 731A dispersant, Dow Chemical, Midland, MI (Dow);
[2]TAMOL ™ 831 dispersant, Dow;
[3]TERGITOL ™ 15-S-40 surfactant, Dow;
[4]ECOSURF ™ LF-30 surfactant, Dow;
[5]DEE FO ™ 1015 Defoamer, Munzing Chemie, GmbH, Heilbronn, DE (Munzing);
[6]ZOCO ™ 101_U539963 pigment, Zochem, Inc., Brampton, ON;
[7]SNOWHITE ™ 12 pigment, Omya, Inc., Cincinnati, OH
[8]DEE FO ™ 1015 defoamer, Munzing;
[9]AGITAN ™ 784 defoamer, Munzing;
[10]Sigma Aldrich, St. Louis, MO (Sigma);
[11]WALOCEL ™ MT 6000 PV, Dow;
[12]DOWANOL ™ DPnBsolvent, Dow;
[13]COLORTREND 832 Yellow Iron Oxide, Chromaflo Technologies, Ashtabula, OH (Chromaflo);
[14]COLORTREND 832 Raw Umber, Chromaflo;
[15]COLORTREND 832 Phthalo Green, Chromaflo.

TABLE 2

Block Resistance Testing with Free Weights

| | | | | | UV Energy (J/cm$^2$) | | | | |
|---|---|---|---|---|---|---|---|---|---|
| Example | Test Conditions | Polymer Tg | PVC (%) | Photo-initiator[2] | UV Exposure | UV-A 320 390 nm | UV-B 280- 320 nm | UV-C 250- 260 nm | UV-V 395- 445 nm | Result |
| 1* | 1 h, 23° C., 40% RH 34.5 kpa | −30° C. | 38 | No | No | | | | | Fail |
| 2 | 1 h, 23° C., 40% RH 34.5 kpa | −30° C. | 38 | Yes | Yes | 6.02 | 3.62 | 0.46 | 4.59 | Pass |
| 3* | 1 h, 50° C., 30% RH, 17.25 kpa | 30° C. | 30 | No | No | | | | | Fail |
| 4 | 1 h, 50° C., 30% RH, 17.25 kpa | 30° C. | 30 | Yes | Yes | 6.02 | 3.62 | 0.46 | 4.59 | Pass |

*Denotes Comparative Example.
1. Cure belt speed 16 feet per minute for 1 minute;
[2]Benzophenone: 0.3 wt. % on polymer solids.

TABLE 3

Block Resistance Testing with C-Clamps and Alcohol Cleaning

| Example | Test Conditions | Polymer Tg | PVC (%) | IPA Cleaning | Result | UV-A 320-390 nm | UV-B 280-320 nm | UV-C 250-260 nm | UV-V 395-445 nm |
|---|---|---|---|---|---|---|---|---|---|
| 5* | 275 kpa C-Clamps 50° C. 4 h | −35° C. | 32 CaCO$_3$; 4 ZnO | No | Fail | 0.00 | 0.00 | 0.00 | 0.00 |
| 6* | 275 kpa C-Clamps 50° C. 4 h | −35° C. | 32 CaCO$_3$; 4 ZnO | Yes | Fail | 0.00 | 0.00 | 0.00 | 0.00 |
| 7 | 275 kpa C-Clamps 50° C. 18 h | −35° C. | 32 CaCO$_3$; 4 ZnO | No | Fail | 3.18 | 1.91 | 0.24 | 2.61 |
| 8 | 275 kpa C-Clamps 50° C. 18 h | −35° C. | 32 CaCO$_3$; 4 ZnO | Yes | Fail | 3.18 | 1.91 | 0.24 | 2.61 |
| 9 | 275 kpa C-Clamps 50° C. 18 h | −35° C. | 32 CaCO$_3$; 4 ZnO | No | Fail | 7.94 | 4.79 | 0.60 | 6.53 |
| 10 | 275 kpa C-Clamps 50° C. 18 h | −35° C. | 32 CaCO$_3$; 4 ZnO | Yes | Pass | 7.94 | 4.79 | 0.60 | 6.53 |

All coating compositions comprise benzophenone in the amount of 0.3% on polymer solids
*Denotes Comparative Example.
1. Cure belt speed 16 feet per minute for 1 minute.

TABLE 4

Block Resistance Testing with Hydraulic Press and Alcohol Cleaning

| Example | Test Conditions | Polymer Tg | PVC (%) | Cure Belt Passes[1] | IPA Cleaning | Result | UV-A 320-390 nm | UV-B 280-320 nm | UV-C 250-260 nm | UV-V 395-445 nm |
|---|---|---|---|---|---|---|---|---|---|---|
| 11* | 275 kpa Carver Press 60° C. 4 h | −35° C. | 32 CaCO$_3$; 4 ZnO | 5 | No | Fail | 7.94 | 4.79 | 0.60 | 6.53 |
| 12 | 275 kpa Carver Press 60° C. 4 h | −35° C. | 32 CaCO$_3$; 4 ZnO | 5 | Yes | Pass | 7.94 | 4.79 | 0.60 | 6.53 | note
All coating compositions comprise benzophenone in the amount of 0.3 wt. % on polymer solids
*Denotes Comparative Example;
[1]Cure belt speed 16 feet per minute for 1 minute.

As shown in Table 3, above, the UV treated coated boards made from the coating compositions of Example 10 passes a higher pressure block resistance test at 275 kpa with a combination of both UV light exposure and iso propyl alcohol cleaning. However, when compared with Example 8, additional UV exposure may be need for block resistance in a higher pressure, higher pressure duration test. In the C-Clamp test, the clamps may also compress the wood in the test block at the pressures tested, making the test difficult to pass. However, at the higher test pressures and test durations where an alcohol cleaning was not done, none of the coatings of Examples 7 and 9 and Comparative Example 5 provided block resistance.

As shown in Table 4, above, the UV treated coated boards made from the coating compositions of Example 12 passed the highest pressure and temperature block resistance test with a combination of both UV light exposure and iso propyl alcohol cleaning. However, as the Comparative Example 11 demonstrates, additional UV exposure may be needed to pass a block resistance test at a very high pressure, and a very long duration.

As the above Examples demonstrate, the substrate that can be used to provide the block resistant coated substrate of the present invention is not particularly limited in material terms and the methods in accordance with the present invention can be applied any kind of substrate material to which a given coating composition will adhere.

The invention claimed is:

1. A method of making a block resistant coated substrate, wherein the method comprises:
   at least partially coating the substrate with an aqueous coating composition to form an aqueous coating layer, the aqueous coating composition having in it one or more photoinitiators;
   drying the aqueous coating layer to form a coated substrate; and,
   exposing the coated substrate to ultraviolet (UV) light, thereby causing the coating to develop block resistance and form a block resistant coated substrate; and
   wiping the block resistant coated substrate with a polar solvent to improve the block resistance,
   wherein the coating on the coated substrate is fully dried prior to the exposing;
   wherein the aqueous coating composition consists of one or more metastable aqueous emulsion copolymers, in copolymerized form, of one or more of butyl acrylate (BA), 2-ethylhexyl acrylate (2-EHA), ethyl acrylate (EA), dodecyl methacrylate or octadecyl methacrylate copolymerized with butyl methacrylate (BMA) and/or methyl methacrylate (MMA) with, in copolymerized form, an acid and/or hydroxyl group containing monomer; one or more photoinitiators; surfactants or emulsifiers; water; and one or more optional ingredients selected from biocides, insecticides, insect repellants, rheology modifiers, extenders, opacifying pigments, colorants, fly ash, dispersants, defoamers, UV stabilizers, colorants, fire retardants, pH adjusters or buffers, coalescents, glass fibers, carbon fibers, microbeads, anti-freeze agents, infrared-reflective material, and materials that impart freeze-thaw stability; and
   wherein the amount of the acid and/or hydroxyl group containing monomer ranges from 0.3 to 2.0 wt. %.

2. The method as claimed in claim 1, wherein the one or more photoinitiators is chosen from a hydrogen abstraction initiator or another initiator that reacts or that becomes activated in the presence of UV light.

3. The method as claimed in claim 2, wherein the one or more photoinitiators is a benzophenone group containing or a xanthone group containing initiator.

4. The method as claimed in claim 1, wherein the exposing the coated substrate to UV light comprises exposing the coated substrate to UV light energy having a wavelength that matches the spectral activation window of at least one of the one or more photoinitiators.

5. The method as claimed in claim 4, wherein in the exposing the coated substrate to UV light, the amount of UV light energy having a wavelength that matches the spectral activation window of the one or more photoinitiators to which the coated substrate is exposed ranges from 3.5 to 30 $J/cm^2$.

6. The method as claimed in claim 1, wherein the polar solvent is an alkanol.

7. The method as claimed in claim 1, wherein the substrate is a board and wherein the method further comprises, if needed, completing the curing or drying of the coating on the block resistant coated substrate and then stacking another board, or coated or uncoated substrate onto the block resistant coated substrate.

8. The method as claimed in claim 1, wherein the one or more metastable aqueous emulsion copolymers have ambient film-forming properties and have a calculated glass transition temperature (calculated Tg) of from −100 to 60° C.

9. The method of claim 1, wherein wiping comprises wiping the surface of the block resistant coated substrate using an isopropyl alcohol wet wipe.

\* \* \* \* \*